(12) United States Patent
Braudaway et al.

(10) Patent No.: US 10,958,926 B2
(45) Date of Patent: Mar. 23, 2021

(54) DIGITALLY WATERMARKED COMPRESSED VIDEO IMAGE SEQUENCES

(71) Applicant: International Business Machines Corporation, Armonk, NY (US)

(72) Inventors: Gordon W. Braudaway, Yorktown Heights, NY (US); Frederick C. Mintzer, Shrub Oak, NY (US)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 16/238,519

(22) Filed: Jan. 3, 2019

(65) Prior Publication Data

US 2020/0221112 A1 Jul. 9, 2020

(51) Int. Cl.
*H04N 19/467* (2014.01)
*H04N 21/8358* (2011.01)
*H04N 19/48* (2014.01)
*G06T 1/00* (2006.01)

(52) U.S. Cl.
CPC ......... *H04N 19/467* (2014.11); *G06T 1/0085* (2013.01); *H04N 19/48* (2014.11); *H04N 21/8358* (2013.01)

(58) Field of Classification Search
CPC .. H04N 19/467; H04N 21/8358; H04N 19/48; G06T 1/0085
USPC ....................................................... 382/100
See application file for complete search history.

(56) References Cited

U.S. PATENT DOCUMENTS

| 5,825,892 | A | 10/1998 | Braudaway et al. | |
| 6,542,609 | B1* | 4/2003 | Ryan | H04N 5/913 348/E7.004 |
| 6,571,021 | B1 | 5/2003 | Braudaway | |
| 6,577,744 | B1 | 6/2003 | Braudaway et al. | |
| 6,807,634 | B1 | 10/2004 | Braudaway et al. | |
| 7,062,067 | B2 | 6/2006 | Braudaway et al. | |
| 7,124,298 | B2* | 10/2006 | Beekmans | G06T 1/005 713/176 |
| 7,130,442 | B2 | 10/2006 | Braudaway et al. | |
| 7,181,625 | B2 | 2/2007 | Peled et al. | |
| 7,266,216 | B2 | 9/2007 | Braudaway et al. | |
| 7,583,814 | B2 | 9/2009 | Braudaway et al. | |
| 7,983,440 | B1* | 7/2011 | Roberts | H04N 1/32336 382/100 |
| 8,023,159 | B2 | 9/2011 | Braudaway et al. | |
| 8,457,349 | B2* | 6/2013 | Roberts | H04N 21/44 382/100 |
| 2002/0071593 | A1* | 6/2002 | Muratani | H04N 1/32144 382/100 |
| 2003/0221106 | A1* | 11/2003 | Delp | H04N 21/8358 713/176 |
| 2005/0185819 | A1 | 8/2005 | Delp et al. | |
| 2005/0193205 | A1 | 9/2005 | Jacobs et al. | |

(Continued)

*Primary Examiner* — Jerome Grant, II
(74) *Attorney, Agent, or Firm* — Daniel P. Morris; Lou Percello, Attorney, PLLC

(57) ABSTRACT

The invention is a novel watermark in a media sequence and systems and methods for embedding and detecting the watermark. Different watermarks from a watermark set of pseudo random watermarks are selected (randomly or by a selection pattern) and each selected watermark is embedded in a different selected I-frame set of the media stream. Identifying the known sequence of watermarks in the stream of I-frames of a copy can identify the video stream from which the copy originates.

19 Claims, 6 Drawing Sheets

(56) References Cited

U.S. PATENT DOCUMENTS

| | | |
|---|---|---|
| 2005/0265576 A1 | 12/2005 | Seong et al. |
| 2007/0277039 A1 | 11/2007 | Zhao |
| 2014/0105451 A1* | 4/2014 | Evans .................. G06T 1/0035 382/100 |
| 2016/0328398 A1* | 11/2016 | Adams .................. G06F 16/951 |
| 2020/0206635 A1* | 7/2020 | Mojarad ................. G06F 16/70 |

* cited by examiner

DIGITALLY WATERMARKED COMPRESSED VIDEO IMAGE SEQUENCES

BACKGROUND

The present invention relates to a system and method that marks digital motion image media sequences, (e.g., digital television, motion pictures, digital video disks-DVDs), whether compressed or not, with invisible robust texture patterns, also called watermarks. More specifically, the invention relates to selectively embedding a secure digital watermark within selected I-frames of a compressed media sequence.

Media sequences (motion pictures, recorded television programming, and the like) represent tangible and valuable assets to their owners. However, any copy of the original sequence can be pirated, recopied and redistributed without just compensation to the original owner. A good deterrent against copyright infringement (also known as software or content piracy) requires that there be permanent but visually undetectable marks embedded in many frames of the media sequence, and that those marks uniquely identify a particular copy of the original media sequence.

Video image sequences comprise a sequence of sequential images, also called sequential frames. Most video compression methods compress the sequential frames, and therefore compress the video image sequence, by compressing and sending a complete frame only intermittently. Typically, these intermittent full-image frames are compressed by standard methods that require access only to the content of the specific frame being compressed, without reference to adjacent frames in the sequence. For that reason, they are called intra-frame compressed images, or I-frames.

Between I-frames, various other forms of information are transmitted, such as compressed difference image frames, motion compensation vectors, other out-of-sequence I-frames, etc. from which the frame sequence between I-frames (e.g. those sequential frames not sent) can be reconstructed and placed in their original order. The motion vectors describe movement of parts of the image relative to the I-frames and are used to reconstruct the frames in the sequence between I-frames in large part by interpolation. (These reconstructed frames are also called interpolated frames.) The intermittently compressed and sent I-frames are sent periodically as resets to the intervening frame reconstruction process.

If a watermarked video image sequence is decompressed, dimensionally altered, and/or geometrically distorted, and then recompressed forming an altered image sequence, the robust watermarks remain intact. The watermarks can be detected by first decompressing the altered image sequence, geometrically realigning the image frames with the image frames of the original image sequence and detecting the watermark in the realigned image frames. In no way does dimensionally altering or distorting the images of the video image sequence render the embedded watermark undetectable unless the image itself is damaged beyond usability.

SUMMARY

The present invention relates to a novel watermark on a media stream and a system and method to mark and detect the watermark on a compressed or non-compressed video media sequence/stream.

Different random watermarks, also called random texture patterns, are selected from a watermark set of pseudo random watermarks, herein called a random watermark chain. Each selected watermark is a sequential member of the watermark chain and is embedded in a different selected sequential I-frame set in the media stream. Each I-frame set has one or more I-frames. Identifying the known sequences of watermarks in the stream of I-frame sets of a copy can identify a novel, unique, and specific video stream from which the copy originates.

Another use of this invention has emerged. For nefarious purposes, video sequences have been edited to show untruthful images, such as the substitution of the face of one person for that of another. Such substitutions defeat the use of video sequences as clear and convincing evidence in legal matters. This can be mitigated using techniques described in this invention.

Using the invisible watermarking techniques described in this invention, each watermarked I-frame can be divided into smaller rectangular sub-frames, much like a sheet of postage stamps. The watermark would be detectable, although with a somewhat lower degree of certainty, in each of the sub-frames because each sub-frame contains a unique fragment of the entire watermark texture pattern applied to the entire image. Therefore, the lack of detection of the unique watermark fragment in one or more sub-frames indicates clear evidence that the original watermarked I-frame image may have been modified in those sub-frame areas. It is virtually impossible for the correct watermark fragment to be detected and re-embedded into any modified sub-frame.

DETAILED DESCRIPTION

The present invention relates to a novel sequence of watermarks on a media stream and a system and method to mark and detect the sequential watermarks on compressed or non-compressed media video image sequence/streams. The invention securely embeds a different digital watermark within each I-frame set of a plurality of I-frame sets in a media sequence. An I-frame set is a grouping of one or more I-frames.

In preferred embodiments, a pseudo random number generator creates a set of pseudo-random numbers. The pseudo random number generator can be defined by a secret key, seed, and method of construction/operation. Different portions of the pseudo-random number set are used to create random number subsets. Each random number subset is used to create a pseudo-random watermark in a watermark chain. Different watermarks from the watermark chain are selected (randomly or by a selection pattern) and each is embedded in a different selected I-frame set of the media (video) stream. A selected watermark is embedded into an I-frame by small and visually unrecognizable variations of the brightness of the individual picture elements (pixels) of the image, where the variation of each pixel brightness is dependent upon a corresponding individual random number of the watermark. Identifying the known sequences/patterns of pixel brightness variations in the I-frames of a copy can identify a novel, unique, and specific media stream from which the copy originates. This method of detection also applies to smaller rectangular sub-frames, where the sub-frames are parts of the I-frame similar to individual stamps that are part of a sheet of postage stamps.

The digital watermark can be used to deter software piracy. In addition, the invention can be used to identify the authorized copy of a media sequence from which a pirated copy was made. Accordingly, the invention can be used to establish a genealogy of the pirated copy, even though the origin of the pirated copy can be any one of millions of authorized copies.

The digital watermark of the present invention will survive cycles of compression and decompression intended to remove the digital watermark. For example, if a first sequence of compressed I-frames (a first compressed I-frame sequence) is decompressed, then the decompressed I-frame sequence is subsequently recompressed into a second compressed I-frame sequence, the original digital watermark patterns which were permanently embedded in the first I-frame sequence, would be not only embedded in the second compressed I-frame sequence but also would be detectable in the re-interpolated frames of the second compressed I-frame sequence.

Figure 1:
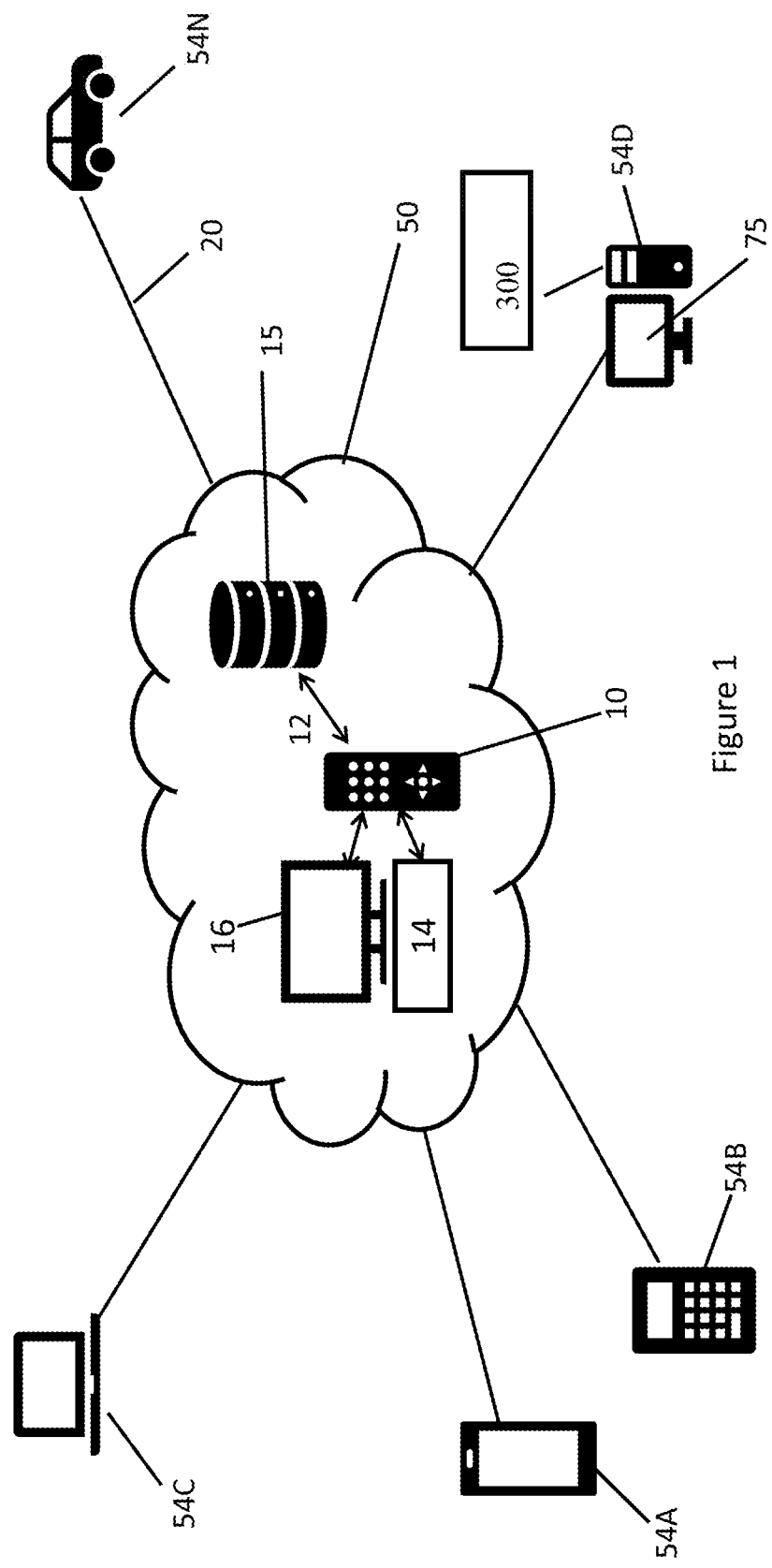
FIG. 1 is a diagram showing the present invention used in a computer network.

Referring now to FIG. 1, an illustration of the present invention 300 used in a network environment 50. As illustrated, the network environment 50 includes one or more network nodes 10 that include central processing units (CPU) 14; storage devices 15; input/output devices 16; and any other computer hardware associated with network devices. The network nodes 10, storage devices 15, and input/output devices 16 are interconnected through network interfaces and interconnections 12. The network 50 may comprise physical hardware or virtual components grouped into one or more networks, such as wide area, internal, community, hybrid, and corporate networks and/or cloud structures that may also be interconnected with other similar networks 50 through network interconnections, typically 12 or 20.

The network environment 50 can provide infrastructure, platforms, and/or software as services to customers and/or client devices (generally 54, including but not limited to 54A, 54B, 54C, 54D, and 54N) connected (typically 20) to the network 50 through network interfaces 20. For example, client devices 54 connected to the network can include digital assistants (PDA) 54A, cell phones 54B, laptop or notepad computer 54C, and desktop computers or servers 54D. Additional mobile devices or remote devices, e.g. on vehicles (including automobiles, trucks, trains, boats, etc.) 54N and remote sensing devices (e.g., remote weather sensors, etc.) 54N also can be connected 20 to the network 50. As stated, the description of the network 50 and the computing nodes (10, 12 typically) is intended to be illustrative only.

User interfaces, e.g. a graphical user interface (typically 75) are shown used with the desktop computer/server 54D typically, but one or more of these user interfaces (keyboard, mouse, pointing device, voice recognition, etc.) can be used with any of the devices connected in 12 or connected to 20 the network 50. Network connections (typically 12, 20) can be any known connections for transmitting and receiving information including network interconnects, hardwiring, cable, radio frequency, satellite, etc. Non-limiting example connections (12, 20) envision hardware connections and switching components, software and virtual connection and connections, web browsers, and other interfaces.

Preferred embodiments of the present invention 300 typically run on the desktop computer/server 54D but can run on, control, be controlled, and/or be displayed on any of the network node/devices 10 and/or client devices 54. In addition, the invention 300 can run on a single device (10, 54), or multiple devices (10, 54), or be distributed across multiple devices (10, 54) across the network 50. The invention can be provided as a service on the network 50 to clients 54 connected to the network or can run on an individual device 54 as a subscription or local process.

Figure 2:
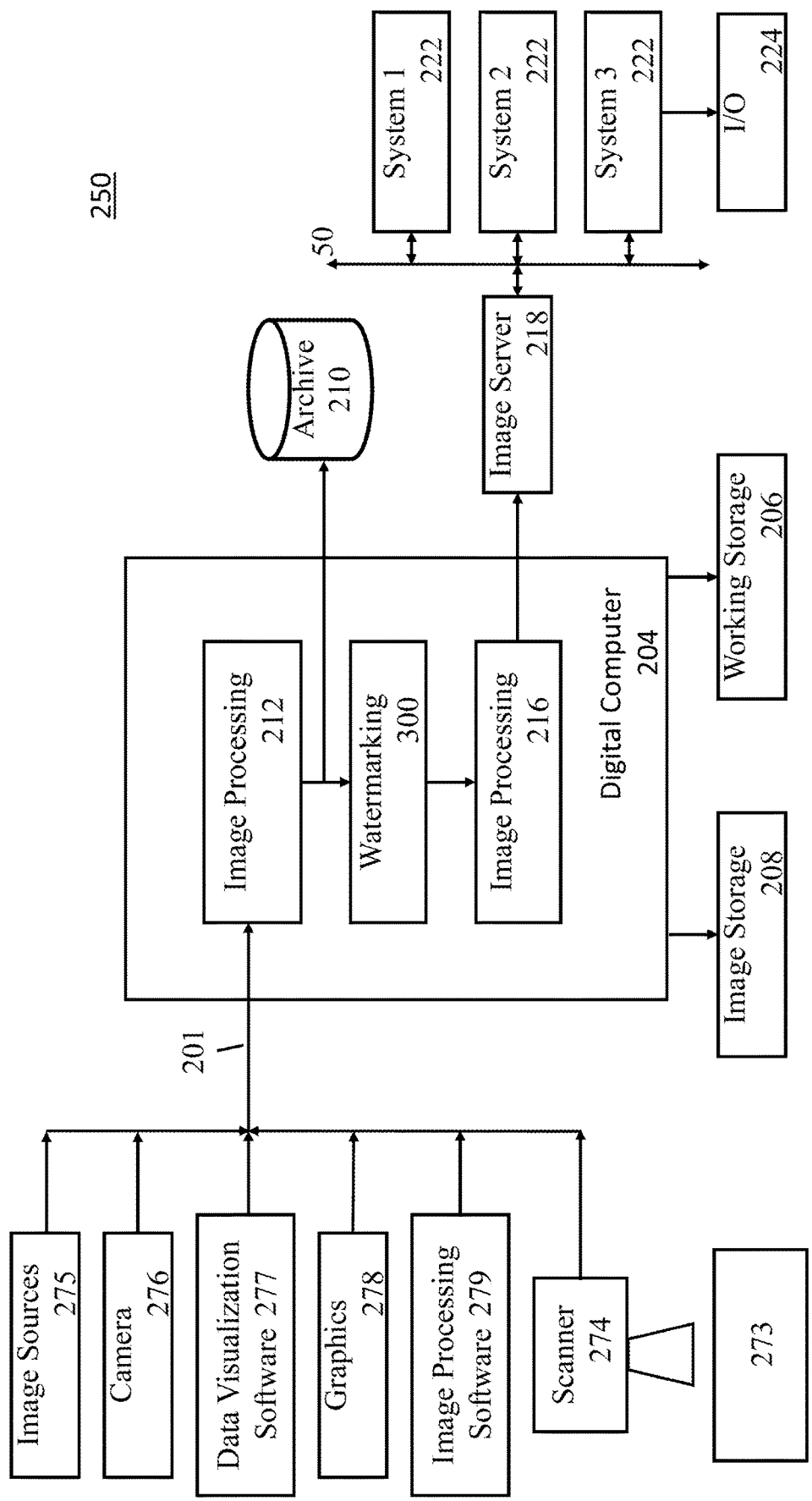
FIG. 2 is a block diagram showing the present invention used on an example device connected to a computer network.

FIG. 2 shows a block diagram of one preferred system, an image capture and distribution system 250, for imparting a relatively invisible watermark on a digitized image in accordance with the present invention 300.

Image data 201, can originate from a variety of sources 275. For example, in some preferred embodiments, the image data 201 can come from a digital camera 276, data visualization software running on a computer 277, computer graphics software running on a computer 278, and/or image processing software 279 that might composite image content from potentially many sources. In an alternative preferred embodiment, a scanner or other image capture device 274 captures image data 201, e.g. a media stream, from a physical source 273, like any physical visual work 273, e.g. a painting, photograph, image file, a video stream, etc.

A digital computer 204 receives the image data 201. The computer 204 may include a working storage 206 that is typically embodied in the computer's random access memory, an image storage system 208 that is often a conventional hard disk drive, and an image archive 210 that can be a tape or disk storage. The computer 204 also includes a number of software modules. These can include front end image processing software 212 that performs image processing such as scaling, enhancement, and/or compression or decompress of the image data 201 provided by the any image source(s) 275. It also includes watermarking processes 300 operating in accordance with the principles of the present invention, and back-end image processing software 216 that may perform other processing functions such as compression on the watermarked image. In some preferred embodiments, the unprocessed or frontend digitized original image 201 is sent to the image archive 210 for preservation in unwatermarked form. An alternate embodiment has the original image already available in digitized form 201, e.g. over the network 50 through a network connection (12, 20.)

The watermarking process 300 applies a relatively invisible watermark to the digitized media stream 201 in accordance with the principles of the present invention. The watermarking process can also be performed on a copy of an archived image or on other scanned and processed image data, which has been loaded in whole or in part, into the computers working storage 206 or on media streams inputted and outputted on network interface connections (12, 20.) In preferred embodiments, the processed, watermarked and compressed image produced by the combination of the software modules 212, 300, and 216 is sent from the working storage 206 or image storage 208 to an image or general-purpose server 118 that is connected to the digital network 50.

In some embodiments, the digital network 50 is interconnected with a Local Area Network (LAM), a Wide Area Network (WAN) such as the Internet, or both. Other systems 222 connected to the digital network 50 can request and receive images stored on the image server 218 via the digital network 50. In some cases, the systems can then display the received images on an input/output (I/O) device 224 like a display device, printer, or video system. Those skilled in the art will recognize that there are many other system configurations in which the present invention 300 could be employed. The system of 250 and/or systems 222 may include processes for detecting and demonstrating the existence of the watermark in a manner such as those described subsequently in FIG. 6 below.

Figure 3:
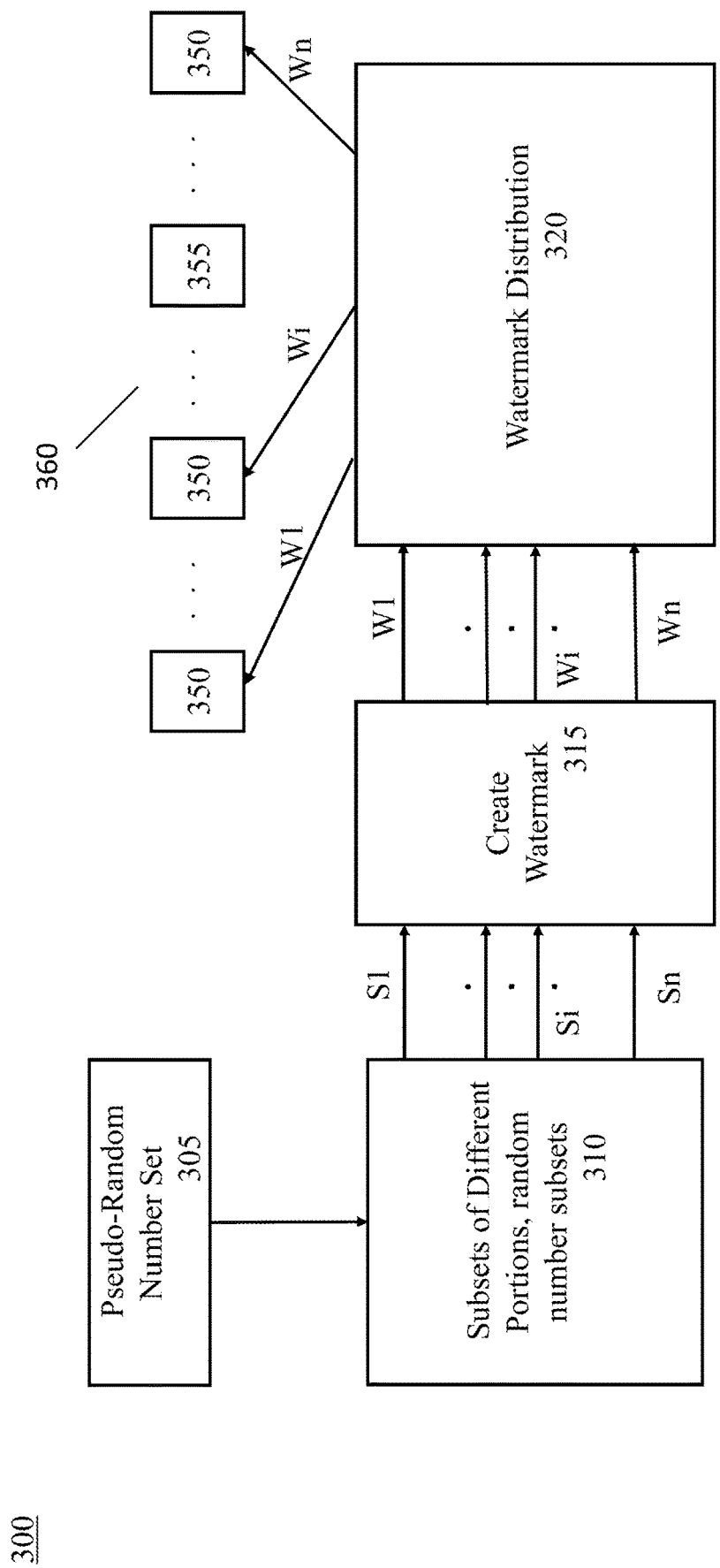
FIG. 3 is a diagram showing a watermarking encoding system.

FIG. 3 is a diagram showing a watermarking encoding process 300. The process 300 includes a pseudo-random number generator 305 for generating a set of pseudo-random numbers, i.e. a pseudo-random number set 305. A process (410, below) selects different portions of the pseudo-random number set 305 to create random number subsets 310, e.g. S1 through Sn. In a preferred embodiment, each random number subset 310, S1, is different from the other random number subset 310 but is derived from the same pseudo-random number set 305. A set of watermarks, i.e. a watermark set 315, is created, e.g., watermarks W1 through Wn. Each watermark, W1, in the watermark set 315 is created from a different random number subset 310 and is therefore pseudo random and different from but related to the other watermarks in the watermark set 315 since all the watermarks are derived from the same pseudo-random number set 305. A watermark distribution process 320 selects one or more watermarks, W1, from the watermark set 315 and embeds each selected watermark into a single I-frame set 350. An I-frame set 350 is one or more I-frames in an image sequence 360 grouped together. In preferred embodiments, some I-frames and/or I-frame sets 355 are chosen to have no embedded watermark.

The resulting watermarked image stream 360 has a first set of one or more I-frames (first I-frame set) 350 with a first watermark, W1; a second set of one or more I-frames (second I-frame set) 350 embedded with a second watermark, W2; a third set of one or more I-frames (third I-frame set (350 embedded with a third watermark W3, etc.

Various patterns can result in the image stream 360 created by the watermark distribution and embedding process 320.

There may be an "I-frame set pattern" in the stream 360 created by selecting the number of I-frames in each I-frame set 350 embedded with the same watermark, W1. For example, the first watermark, W1, is embedded in the first I-frame set 350 containing one I-frame, the second watermark, W2, is embedded in the second I-frame set 350 containing two I-frames, the third watermark, W3, is embedded in the third I-frame set 350 containing three I-frames, etc. Any number of patterns for selecting the number of I-frames in an I-frame set 350 associated with a given watermark, W1, can be envisioned. The number of I-frames grouped in an I-frame set 350 and then associated with a given watermark, W1, can be predetermined, e.g. based on an algorithm; random; or a combination of some predetermined and some randomly selected. Other I-frame set patterns are envisioned.

The "I-frame distribution pattern" can include a spacing of I-frames with no watermark between one or more of the I-frame sets 350 embedded with a watermark. This spacing, e.g. the number of reconstructed frames or interpolated frames between I-frame sets 350, can be predetermined, e.g. based on an algorithm; random; or a combination of some predetermined and some randomly selected. Other I-frame distribution patterns are envisioned.

In preferred embodiments, the selected watermark, W1, associated with each I-frame set 350 can create a "watermark pattern" in the stream 360. For example, watermarks are created 315 from subsets of different portions 310 of the pseudo-random number set 305. The random number subsets 310 can be created by a predetermined pattern, e.g. picking every 3rd number in the pseudo-random number set, which would result in a predetermined relationship among the created watermarks. The watermarks can be distributed 320 according to this relationship, e.g. the series of I-frame sets 350 is embedded with a watermark selected by a predetermined order of creation. Alternatively, the order by which the watermarks are selected for embedding can be predetermined, e.g. based on an algorithm; random; or a combination of some predetermined and some randomly selected. Other selection patterns are envisioned.

In like fashion, how the watermarks are embedded in each I-frame set 350 can create an "embedding pattern." For example, the first watermark can be embedded in the top, left corner of the first I-frame set 350, the second watermark can be embedded in the entire image of the frames in the second I-frame set 350, the third watermark can be embedded in the bottom right corner of the third I-frame set 350 set of frames, etc. Again, the embedding pattern can be predetermined, e.g. based on an algorithm; random; or a combination of some predetermined and some randomly selected. Other embedding patterns are envisioned.

Other patterns and combinations of patterns can be envisioned given this disclosure.

Knowing the patterns and/or combinations of patterns in the original stream 360 can be helpful in determining from which original stream any copy was made.

Figure 4:
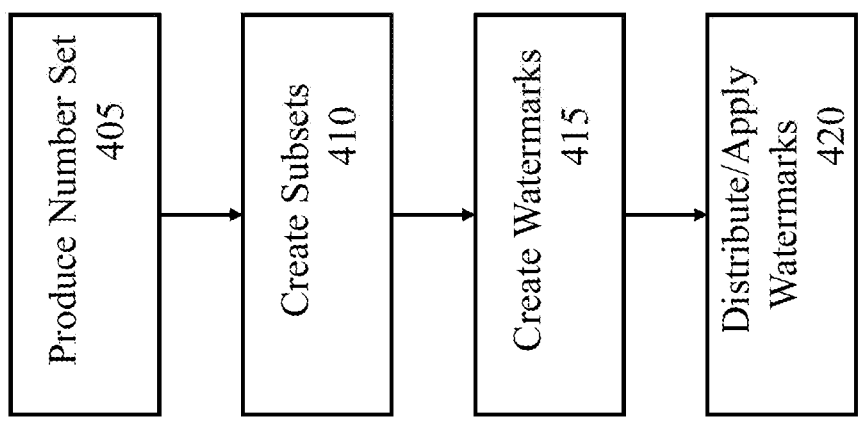
FIG. 4 is a flow chart showing a process of embedding watermarks into a stream.

FIG. 4 is a flow chart showing a process 400 of embedding watermarks into a stream 360.

Step 405 produces a common source for creating the watermarks. In a preferred embodiment, this common source is a pseudo-random number set 305 created by a pseudo-random number generator, for example a generator using the SHA-256 Cryptographic Hash Algorithm. By knowing the method of creating the pseudo random numbers, the secret key and the starting seed used to generate it, one can recreate the pseudo-random number set 305. The secret key and seed can be sent from the point where the watermark is embedded to the point where the watermark is detected.

The random number subsets 310 are created in step 410. Using a secret key and a known number called a seed, an example random number generator using the SHA-256 Cryptographic Hash Algorithm creates a random hash of the seed called a first random number. Then using the same key and the first random number as the second seed, the random number generator is reapplied to produce a second random number. And again, reapplying the random number generator using the secret key and the second random number as the seed, a third random number is produced. The process is repeated as many times as required to produce the random number subsets used to construct the watermarks. The sequence of random numbers can be reproduced at any future time knowing only the secret key, the original seed, and the specific random number generator used.

The set of watermarks 315 are created in step 415. In one preferred embodiment, the random number subsets 310 are used in a process 415 to alter an I-frame or I-frame set 350 in a particular way to create a watermark, e.g. a watermark invisible to a human observer, in the typical I-frame set 350.

For example, each value in the random number subset 310 is assigned a location on the I-frame, e.g. a pixel, and a characteristic of the pixel, e.g. the brightness of the pixel, is increased or decreased to embed this part of the watermark into the set of I-frames 350.

Step 420 defines the process by which a particular watermark is associated and embedded in an I-frame set 350. For example, the first watermark will be embedded in the I-frames set 350 comprising the first four I-frames in the sequence 360, the second watermark will be embedded in the I-frame set comprising the second four I-frames in the sequence 360, etc.

In some preferred embodiments, all the compressed and sent I-frame sets 350 are not marked with the same watermark, e.g., a textured pattern. In these embodiments, a first I-frame set or group of the sent I-frames are selected and marked with a first watermark/textured pattern, a second set or group of sent I-frames (second I-frame set) is selected and marked with a second watermark/textured pattern, and so forth. The selected I-frame sets may or may not be contiguous. For example, there may be an unselected set of sequential frames (I-frame set) between the first and second selected and watermarked sent I-frames. These sequential frames in these unselected sets (for watermarking) can be unsent or sent but marked in different ways. For example, in some preferred embodiments, sequential frames between (directly or not) two selected sets (for watermarking), i.e. a transition set, can be marked with a linear combination of the digital watermarks (texture patterns) of the first and second watermarks (textured patterns) between which the transition set is sequenced.

In preferred embodiments, the compressed and sent I-frames are not marked with the exact common watermark/textured pattern but are marked with different patterns where each different pattern is a member of a finite set of patterns derived from a same common textured pattern. In one non-limiting example of this embodiment, the finite set of patterns is generated using different portions of a unique and reproducible pseudo-random number set. The pseudo-random number set is reproducible knowing only its method of construction, a secret key that is not divulged, and a seed.

Using a number of watermarks in either a specific or random order greatly lessen vulnerability to their discovery and removal by an unscrupulous party. Equally importantly, a known detectable sequence of different watermarks helps facilitate a definitive identification of a specific video sequence copy.

Figure 5:
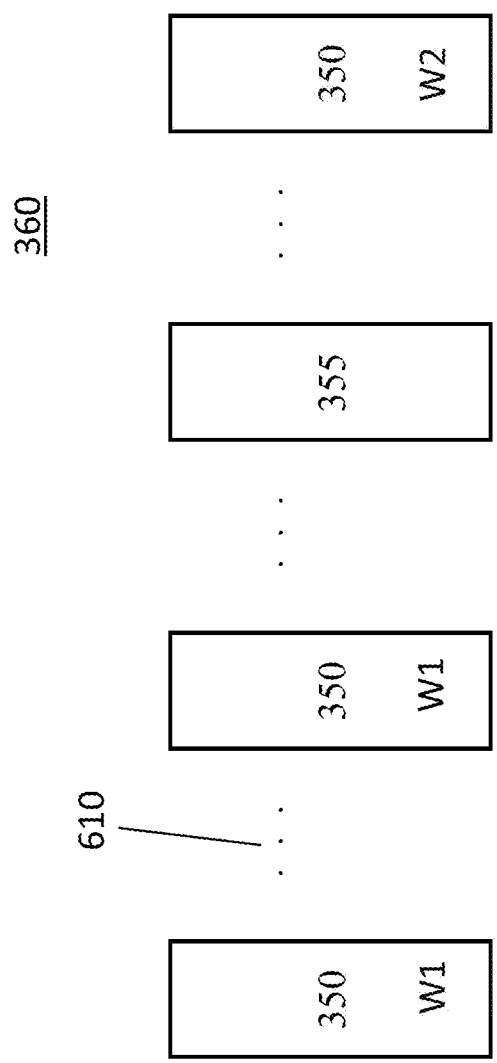
FIG. 5 shows a novel stream having sequence of I-frames watermarked using the present invention.

FIG. 5 shows a novel stream 360 having sequence of I-frames watermarked using the present invention.

In a preferred embodiment, all the original frames are not marked with the same single invisible watermark, but rather short groups of the original frames, e.g. I-frame sets 350, are marked with a first watermark. Other I-frame sets 350 are marked with a second watermark, different than the first watermark. Transitional frames 610, e.g. those frames (unmarked I-frame sets and/or interpolated frames between marked I-frame sets may be marked by a linear combination of the watermarks used on the surrounding marked I-frame sets 350.

Using a single watermark in every original frame, and thereby in every selected I-frame, could compromise the protection afforded. Instead, a finite number of different watermarks, all generated 415 using different portions 410 of a unique and reproducible pseudo-random number set 405, are used. The pseudo-random number set 405 is reproducible knowing only its method of construction, a secret key that is not divulged, and a seed.

Figure 6:
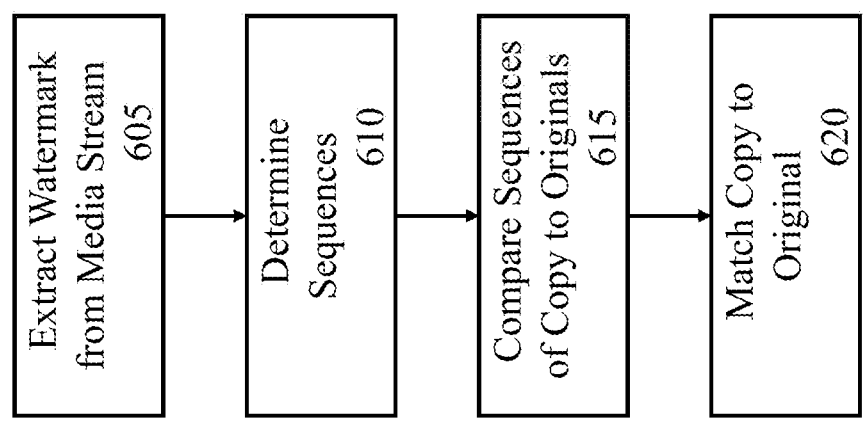
FIG. 6 is a flow chart showing a process of detecting embedded watermarks in a stream and determining if a document is a copy of a specific original video stream.

FIG. 6 is a flow chart showing a process 600 of detecting embedded watermarks in a stream and determining if a document is a copy of a specific original.

Step 605 begins by extracting 605 watermarks 315 from a target media stream. This step requires access to the original unmarked media stream called the original stream. This step includes identifying the I-frames with the same watermark, the number of these I-frames grouped together and the position of these groups (I-frame sets) in the stream 360; the I-frames with no watermark (if any), the number of these I-frames that are grouped together and the position of these groups in the stream 360; the number of frames between I-frame sets; how the watermark was embedded in each I-frame; and any relationship between watermarks. Other patterns are envisioned.

In step 610, one or more of the sequences are identified.

In step 615, the identified sequences are compared against a database of sequence sets that are associated with original stream. If, for example, a particular watermark was inserted into the I-frame images by multiplying the brightness of each pixel by a factor near unity (an insertion factor), that is either greater than or less than unity, derived from the corresponding random number in the watermark in the same manner for all insertion factors, then the ratio of the I-frame pixel brightness in the watermarked image to the brightness of the corresponding pixel in the I-frame of the original image would bear a constant multiplicative relationship (the ratio of the ratios) to the corresponding insertion factor. Detection of the same or nearly the same multiplicative relationship for a preponderance of pixels in the I-frame image is strong evidence of detecting the particular watermark. Likewise, a random variation of the multiplicative factors of the pixels is strong evidence of not detecting the particular watermark. This method of detection is applicable not only to I-frames, but also to sub-frames within the I-frame.

In step 620, the original streams that has patterns that match all the patterns identified in the target media stream is the original media stream from which the target stream was copied.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. For example, many patterns and/or sequences in the media stream can be used. Further, the principles of the invention can be applied to all media streams including video, data, still images, etc. The terminology used herein was chosen to best explain the principles of the embodiments, the practical application or technical improvement over technologies found in the marketplace, or to enable others of ordinary skill in the art to understand the embodiments disclosed herein.

We claim:

1. A watermarking system comprising:
   one or more computer system having one or more central processing units, one or more memories, one or more input/output devices and one or more network connections;
   a watermarking process that:
   a. receives one or more media streams over one or more of the network interfaces, groups one or more of the I-frames in the media stream into an I-frame set to create a plurality of I-frame sets;

b. creates a watermark set of one or more watermarks from a common watermark, each of the watermarks being related to the common watermark but different from one another; and c. marking all the I-frames in a first I-frame set with a first watermark selected from the watermark set and marking all the I-frames in a second I-frame set with a second watermark selected from the watermark set, the second watermark different than the first watermark.

2. A watermarked media stream, as in claim 1, further comprising one or more I-frame sets with no watermarks.

3. A watermarked media stream, as in claim 1, further comprising one or more interpolated frames between a pair of I-frames.

4. A watermarked media stream, as in claim 3, where one or more of the interpolated frames is in an I-frame distribution pattern.

5. A watermarked media stream, as in claim 1, where the frames in an I-frame set is in an I-frame set pattern.

6. A watermarked media stream, as in claim 1, where the method of embedding the watermark in two or more I-frame sets in the media stream is in an embedding pattern.

7. A watermarked media stream, as in claim 1, where the I-frames comprise content in one or more of the following medias: video sequences, still images, and data.

8. A system, as in claim 1, where each of the watermarks is a pseudo-random watermark selected from a database of pseudo-random common watermarks.

9. A system, as in claim 8, where each of the pseudo-random watermarks in the database is generated from a random number subset of a pseudo-random number set.

10. A system, as in claim 9, where the pseudo-random number set is generated with a seed number and a method of construction.

11. A system, as in claim 1, where each of the watermarks marking each of the I-frame sets is related in a watermark pattern.

12. A watermarked media stream, as in claim 1, having one or more patterns that are recognized in a target media stream that was copied from an original media stream.

13. A method of watermarking a media stream comprising the steps of:
   selecting one or more sets of I-frames from the media stream;
   grouping the selected sets of I-frames each into an I-frame set;
   creating a plurality of I-frame sets;
   creating a watermark set of one or more watermarks from a common watermark, each of the watermarks being related to the common watermark but different from one another; and
   marking all the I-frames in a first I-frame set with a first watermark selected from the watermark set and marking all the I-frames in a second I-frame set with a second watermark selected from the watermark set, the second watermark different than the first watermark.

14. A method of watermarking, as in claim 13, where each of the watermarks is selected from a database of pseudo-random watermarks generated from a database of pseudo random numbers.

15. A method of watermarking, as in claim 14, where each of the watermarks is created from a unique random number subset of the database.

16. A method of watermarking, as in claim 15, where the unique random number subset that creates the respective watermark is randomly assigned.

17. A method of watermarking, as in claim 15, where the unique random number subset that creates the respective watermark is assigned in a predetermined manner.

18. A method of watermarking, as in claim 17, where there is a relationship between the watermarks due to the assignment.

19. A method of watermarking, as in claim 18, where the relationship can be used as a pattern recognized in a target media stream that was copied from an original media stream.

* * * * *